(12) United States Patent
Ishii et al.

(10) Patent No.: US 10,187,279 B2
(45) Date of Patent: Jan. 22, 2019

(54) CONTROLLER, CONTROL SYSTEM, AND CONTROL METHOD

(71) Applicant: YOKOGAWA ELECTRIC CORPORATION, Musashino-shi, Tokyo (JP)

(72) Inventors: Yousuke Ishii, Tokyo (JP); Masato Yamaji, Tokyo (JP); Masahiro Takekawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 189 days.

(21) Appl. No.: 14/388,653

(22) PCT Filed: Apr. 2, 2013

(86) PCT No.: PCT/JP2013/060059
§ 371 (c)(1),
(2) Date: Sep. 26, 2014

(87) PCT Pub. No.: WO2013/157386
PCT Pub. Date: Oct. 24, 2013

(65) Prior Publication Data
US 2015/0304193 A1 Oct. 22, 2015

(30) Foreign Application Priority Data
Apr. 18, 2012 (JP) .................................. 2012-094947

(51) Int. Cl.
*G06F 15/173* (2006.01)
*H04L 12/26* (2006.01)
(Continued)

(52) U.S. Cl.
CPC ...... *H04L 43/0852* (2013.01); *G05B 19/4185* (2013.01); *H04L 43/10* (2013.01);
(Continued)

(58) Field of Classification Search
USPC ....................................... 709/223, 224, 227
See application file for complete search history.

(56) References Cited

U.S. PATENT DOCUMENTS

| | | | |
|---|---|---|---|
| 5,990,967 A * | 11/1999 | Kawakami | G11B 27/032 348/500 |
| 2001/0005402 A1 * | 6/2001 | Nagatani | H03F 1/3247 375/296 |

(Continued)

FOREIGN PATENT DOCUMENTS

| | | |
|---|---|---|
| CN | 102217326 A | 10/2011 |
| FR | 2861191 A1 | 4/2005 |
| JP | 2011-199420 A | 10/2011 |

OTHER PUBLICATIONS

Shuji Yamamoto, et al., "Field Wireless Solution Based on ISA100. 11a to Innovate Instrumentation", Yokogawa Technical Report, Sep. 17, 2010, pp. 7-12, vol. 53, No. 2.

(Continued)

*Primary Examiner* — Joseph E Avellino
*Assistant Examiner* — Marshall M McLeod
(74) *Attorney, Agent, or Firm* — Sughrue Mion, PLLC (57) ABSTRACT

A controller for using a first data item transmitted via a network to generate a second data item for controlling an entity to be controlled over the network, wherein the controller is characterized in being provided with: an adjustment unit for adjusting, with respect to the maximum delay time permissible on the network, the time by which generation of the second data item is started using the first data item after the first data item has been received; and a delay compensation unit, designed using a model of the entity to be controlled and the maximum delay time permissible on the network, for compensating for the delay of the first and second data items that can be generated using the network.

10 Claims, 3 Drawing Sheets

(51) Int. Cl.
*G05B 19/418* (2006.01)
*H04L 29/08* (2006.01)

(52) U.S. Cl.
CPC .......... *H04L 67/125* (2013.01); *H04L 67/325* (2013.01); *G05B 2219/33192* (2013.01); *G05B 2219/40151* (2013.01)

(56) References Cited

U.S. PATENT DOCUMENTS

| | | | | |
|---|---|---|---|---|
| 2003/0039273 A1* | 2/2003 | Jang | ..................... | H04J 3/0682 370/519 |
| 2003/0149493 A1* | 8/2003 | Blevins | ................ | G05B 13/048 700/18 |
| 2009/0299495 A1* | 12/2009 | Blevins | .................. | G05B 11/42 700/28 |
| 2011/0054640 A1* | 3/2011 | Law | ..................... | G05B 19/418 700/14 |
| 2011/0207417 A1 | 8/2011 | Hays | | |

OTHER PUBLICATIONS

International Search Report for PCT/JP2013/060059 dated Jul. 2, 2013.
Chien-Liang Lai, et al., "Design the Remote Control System With the Time-Delay Estimator and the Adaptive Smith Predictor", IEEE Transactions on Industrial Informatics, vol. 6, No. 1, Feb. 1, 2010, pp. 73-80.

* cited by examiner

CONTROLLER, CONTROL SYSTEM, AND CONTROL METHOD

TECHNICAL FIELD

The present invention relates to a controller and a control system that control a controlled object via a network.

Priority is claimed on Japanese Patent Applications No. 2012-094947, filed Apr. 18, 2012, the content of which is incorporated herein by reference.

BACKGROUND ART

At plants, factories, and such like, it is conventional to construct a distributed control system (DCS), in which devices known as field devices (measuring devices, manipulating devices, etc.) for achieving a high degree of automatic operation, and a control device for controlling them, are connected via a communication means. While most such distributed control systems use wire communication, recently, some are being realized using wireless communication that is compliant with wireless communication standards for industrial automation, such as ISA100.11a and WirelessHART (Registered Trademark).

The distributed control system that performs wireless communication compliant with the wireless communication standards for industrial automation mentioned above broadly includes field devices capable of wireless communication (wireless field devices), a wireless access point device, a control device, and a system manager. The wireless access point device is connected to the control device and the system manager via a communication line, installed at a position where it can perform wireless communication with the wireless field devices, and relays various types of data that are transmitted and received between the wireless field devices and the control unit. The control unit controls the wireless field devices by transmitting and receiving various types of data (e.g. measurement data and control data) to and from them via the wireless access point device.

The system manager manages and controls resources such as the frequency channel, communication schedule, and communication path of the wireless communication network formed by the wireless access point device and the wireless field devices, and thereby manages and controls the wireless communication performed via the wireless communication network. The non-patent document 1 discloses one example of a control system capable of wireless communication compliant with ISA100.11a.

PRIOR ART DOCUMENTS

Non-Patent Documents

[Non-Patent Document 1] "Field Wireless Solution Based on ISA100.11a to Innovate Instrumentation" in Yokogawa Technical Report English Edition Vol. 53 No. 2 (2010)

DISCLOSURE OF INVENTION

Problems to be Solved by the Invention

Since safety and reliability have highest priority at plants and the like, in a distributed control system it is extremely important that the control loop for controlling various state quantities in the industrial process (e.g. pressure, temperature, flow volume, etc.) is executed stably. A control loop in a distributed control system broadly includes the following elements (1) to (5).

(1) Measurement of state quantities by field device
(2) Transmission of measurement results (measurement data) from field device to control device
(3) Control device calculates control data in accordance with measurement data
(4) Control device transmits control data to field device
(5) Field device manipulates state quantity based on control data Since wireless communication via the wireless communication network described above is susceptible to delays and jitters, the time required for the processes of (2) and (4) is uncertain, and there is a problem that this will adversely affect the stability of the control loop. For example, when a large delay has occurred on the wireless communication network, a phenomenon occurs where the control data from the control device is not input to the field device at the proper timing and is lost. Also, when a jitter has occurred on the wireless communication network, a phenomenon occurs where input and output timings of the measurement data and the control data deviate from the control cycle in which the control device controls the field devices.

When such phenomena occur, the behaviour of the state quantity which is the controlled object becomes oscillatory (unstable), and there is a conceivable problem that the safety and reliability of the plant will deteriorate. This problem arises not only when using a wireless communication network, but also when using an unstable wired network that is susceptible to delays and jitters. This problem is especially likely to arise when transmitting and receiving measurement data and control data via the internet.

The present invention provides a control device and a control system that can stably execute a control loop, even when controlling a controlled object via an unstable network.

Means for Solving the Problems

A control device that uses first data, transmitted thereto via a network, to generate second data for controlling a controlled object via the network, may include: an adjustment unit that considers a maximum delay time tolerated by the network, and adjusts a time from a reception of the first data until a start of generating the second data using the first data; and a delay compensation unit that is designed using a model of the controlled object and the maximum delay time tolerated by the network, and compensates delays in the first and second data that can occur in the network.

The first data may contain first time information indicating a time at which the first data was generated or transmitted, and the adjustment unit may adjust a timing so that the second data is started to be generated at a timing when a period of time, which is obtained by subtracting a difference between a time indicated by the first time information and a time at which the first data was received from the maximum delay time tolerated by the network, has elapsed from a point at which the first data was received.

A control system that controls a controlled object via a network, may include: a control device that uses first data, transmitted thereto via a network, to generate second data for controlling a controlled object via the network, the control device including: an adjustment unit that considers a maximum delay time tolerated by the network, and adjusts a time from a reception of the first data until a start of generating the second data using the first data; and a delay compensation unit that is designed using a model of the controlled object and the maximum delay time tolerated by the network, and compensates delays in the first and second data that can occur in the network; and a field device having a timing adjustment unit that considers the maximum delay time tolerated by the network, and adjusts a timing of a manipulation of the controlled object based on the second data transmitted from the control device.

The first data may contain first time information indicating a time at which the first data was generated or transmitted, and the adjustment unit may adjust a timing so that the second data is started to be generated at a timing when a period of time, which is obtained by subtracting a difference between a time indicated by the first time information and a time at which the first data was received from the maximum delay time tolerated by the network, has elapsed from a point at which the first data was received.

The second data may contain second time information indicating a time at which the second data was transmitted, and the timing adjustment unit may adjust a timing so that a manipulation of the controlled object is performed at a timing when a period of time, which is obtained by subtracting a difference between a time indicated by the second time information and a time at which the second data was received from the maximum delay time tolerated by the network, has elapsed from a point at which the second data was received.

The maximum delay time tolerated by the network may include: a first maximum delay time tolerated for data transmitted to the control device; and a second maximum delay time tolerated for data transmitted from the control device.

The control system may further include: a management device that sets the maximum delay time tolerated by the network with respect to the control device and the field devices.

The timing adjustment unit may adjust a timing so that a manipulation is performed when a period of time Tx, shown in Equation (1) below, has elapsed from time t12 when the second data was received at the field device, $$Tx = Td - (t12 - t11) \quad (1)$$

where Td is the maximum delay time tolerated by the network, t11 is a time at which the second data was transmitted from the control device, and t12 is a time at which the second data was received at the field device.

The adjustment unit may adjust a timing so that a setting-value is generated when a period of time Ty, shown in Equation (2) below, has elapsed since time t22 when the first data was received at the control device, $$Ty = Td - (t22 - t21) \quad (2)$$

where Td is the maximum delay time tolerated by the network, t21 is a time at which the first data is generated at or transmitted from the field device, and t22 is a time at which the first data is received at the control device.

The control system may further include: a setting-value generator that uses the first data from the field device to generate a setting-value for controlling the controlled object, at a timing adjusted by the adjustment unit.

The delay compensation unit may be designed using a model element that is a model of a fluid motion characteristic of a fluid which is the controlled object, and a delay element where the maximum delay times tolerated by the network may be set, in addition to a controller, and the delay compensation unit may compensate error between the fluid motion characteristic of the fluid which is the controlled object and the model element, by feeding back a difference 'Y−Y''' between present measurement data 'Y' measured by the field device and data 'Y''' output from the delay element of the delay compensation unit.

A control method that uses first data, transmitted thereto via a network, to generate second data for controlling a controlled object via the network, may include: considering a maximum delay time tolerated by the network, and adjusting a time from a reception of the first data until a start of generating the second data using the first data; and compensating delays in the first and second data that can occur in the network by using a model of the controlled object and the maximum delay time tolerated by the network.

The first data may contain first time information indicating a time at which the first data was generated or transmitted, and the control method may further include adjusting a time so that the second data is started to be generated at a timing when a period of time, which is obtained by subtracting a difference between a time indicated by the first time information and a time at which the first data was received from the maximum delay time tolerated by the network, has elapsed from a point at which the first data was received.

The control method may further include: considering the maximum delay time tolerated by the network, and adjusting a timing of a manipulation of the controlled object based on the second data transmitted from the control device.

The second data may contain second time information indicating a time at which the second data was transmitted, and the control method may further include adjusting a timing so that a manipulation of the controlled object is performed at a timing when a period of time, which is obtained by subtracting a difference between a time indicated by the second time information and a time at which the second data was received from the maximum delay time tolerated by the network, has elapsed from a point at which the second data was received.

The maximum delay time tolerated by the network may include: a first maximum delay time tolerated for data transmitted to the control device; and a second maximum delay time tolerated for data transmitted from the control device.

The control method may further include: adjusting a timing so that a manipulation is performed when a period of time Tx, shown in Equation (1) below, has elapsed from time t12 when the second data was received, $$Tx = Td - (t12 - t11) \quad (1)$$

where Td is the maximum delay time tolerated by the network, t11 is a time at which the second data was transmitted, and t12 is a time at which the second data was received.

The control method may further include: adjusting a timing so that a setting-value is generated when a period of time Ty, shown in Equation (2) below, has elapsed since time t22 when the first data was received, $$Ty = Td - (t22 - t21) \quad (2)$$

where Td is the maximum delay time tolerated by the network, t21 is a time at which the first data is generated at or transmitted, and t22 is a time at which the first data is received.

Effects of the Invention

According to a preferred embodiment of the present invention, a control device considers the maximum delay time tolerated by the network, and adjusts the time from the reception of the first data until the start of generating the second data using the first data; in addition, the control device compensates delays in measurement data and control data that can occur in the network. Furthermore, a field device considers the maximum delay time tolerated by the network, and adjusts the timing of a manipulation that is performed based on the control data after it is received from the control device. Therefore, even if the controlled object is being controlled via an unstable network, the invention obtains an advantage of being able to stably execute the control loop. This can increase the safety and reliability at the plant etc.

EMBODIMENTS FOR CARRYING OUT THE INVENTION

Figure 1:
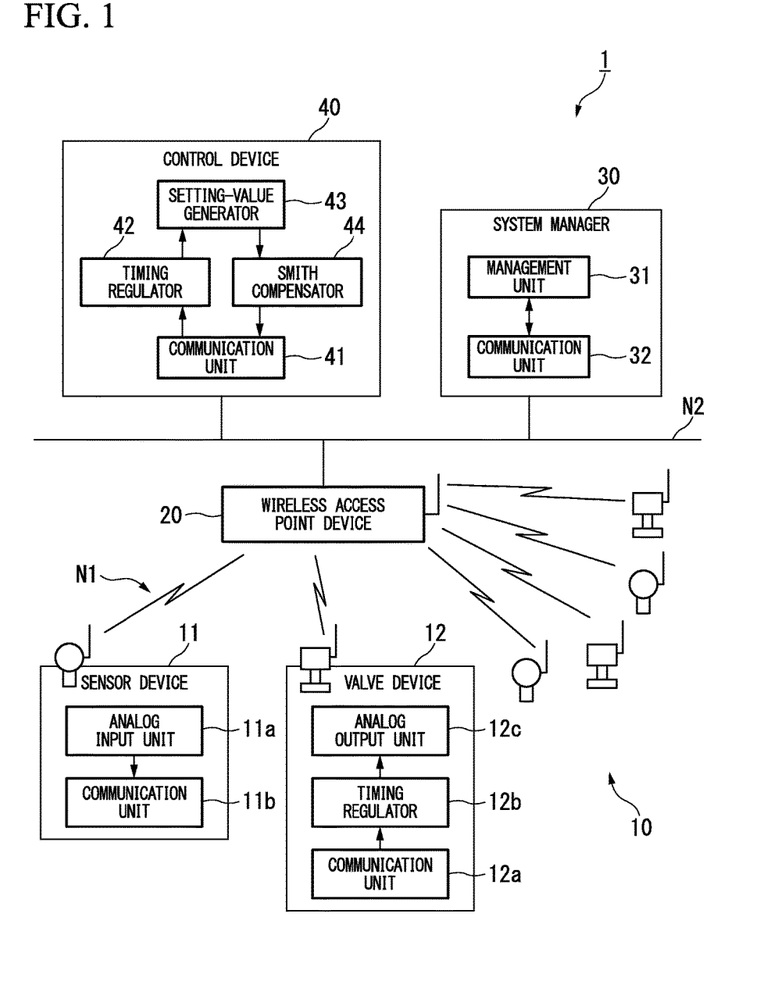
FIG. 1 is a block diagram of the configuration of main parts of a control device and a control system in accordance with a preferred embodiment of the present invention.

A control device and a control system in accordance with a preferred embodiment of the present invention will be explained in detail with reference to the drawings. FIG. 1 is a block diagram of the configuration of main parts of a control device and a control system in accordance with a preferred embodiment of the present invention. As shown in FIG. 1, a control system 1 of this preferred embodiment includes a plurality of field devices 10, a wireless access point device 20, a system manager 30 (management device), and a control device 40. The control device 40 controls the field devices 10 via a wireless communication network N1 (network) and a backbone network N2 (network), whereby the control system 1 controls various state quantities (e.g. pressure, temperature, flow, etc.) in industrial processes realized at a plant (not shown). It is assumed here that the field devices 10 to the control device 40 constituting the control system 1 are all managed according to matching time information.

The field devices 10 are devices installed at the plant, and include, for example, sensors such as flow meters and temperature sensors, valve devices such as flow control valves and on-off valves, and actuator devices such as fans and motors. To facilitate understanding, the example below describes a case where the state quantity (controlled object) being controlled by the control system 1 is the flow of a fluid. Accordingly, in FIG. 1, of the plurality of field devices 10 installed at the plant, one sensor device that measures the flow of the fluid is shown as 'sensor device 11', and one valve device that controls the flow of the fluid is shown as 'valve device 12'.

The sensor device 11 includes an analog input (AI) unit 11a and a communication unit 11b. The sensor device 11 measures the flow of the fluid, which is the controlled object, and sends measurement data indicating the measurement result (first data) to the control device 40. The analog input unit 11a transmits, for example, an ultrasonic signal to the fluid which is the controlled object, and determines the flow of the fluid from a receive signal obtained by receiving the ultrasonic signal through the fluid. The communication unit 11b is capable of wireless communication compliant with a wireless communication standard for industrial automation, such as ISA100.11a or WirelessHART (Registered Trademark). The communication unit 11b performs communication with the wireless access point device 20 via the wireless communication network N1, and transmits the measurement data to the control device 40.

The valve device 12 includes a communication unit 12a, a timing regulator 12b (timing adjustment unit), and an analog output unit (AO) 12c, and performs a manipulation (adjustment of valve aperture) for controlling the flow of the fluid which is the controlled object, based on control data (second data) from the control device 40. Like the communication unit 11b of the sensor device 11, the communication unit 12a is capable of wireless communication compliant with a wireless communication standard for industrial automation, such as ISA100.11a or WirelessHART (Registered Trademark). The communication unit 12a performs communication with the wireless access point device 20 via the wireless communication network N1, and receives control data from the control device 40.

The timing regulator 12b considers the maximum delay times tolerated by the networks used by the control system 1 (wireless communication network N1 and backbone network N2), and adjusts the timing of the manipulation (adjustment of valve aperture) to be performed based on the control data transmitted from the control device 40. The timing is adjusted in this manner to ensure stable execution of the control loop for controlling the flow of the fluid, even if there are delays or jitters in the networks being used by the control system 1. To facilitate understanding in the following explanation, the delay in the backbone network N2 is sufficiently small in comparison with the delay in the wireless communication network N1, so that the delay in the networks used by the control system 1 is roughly equal to the delay in the wireless communication network N1.

Specifically, the timing regulator 12b adjusts the timing so that the manipulation is performed at the point when the maximum delay time has elapsed since the point when the control data was transmitted from the control device 40. That is, if Td is the maximum delay time tolerated by the wireless communication network N1, t11 is the time at which the control data was transmitted from the control device 40, and t12 is the time at which this control data was received at the communication unit 12a, the timing regulator 12b adjusts the timing so that the manipulation is performed when a period of time Tx, shown in Equation (1) below, has elapsed from the time t12 when the control data was received at the communication unit 12a.

$$Tx = Td - (t12 - t11) \qquad (1)$$

The maximum delay time Td tolerated by the wireless communication network N1 is set with consideration for the controllability demanded by the control system 1 and the bandwidth and the like of the network, e.g. it is set at approximately 4 [sec]. At the timing adjusted by the timing regulator 12b, the analog output unit 12c performs the manipulation (adjustment of the aperture of a valve for controlling the flow of the fluid) based on the control data from the control device 40.

Figure 2A:
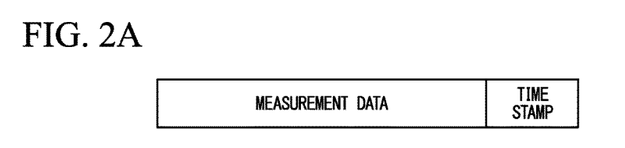
FIG. 2A is a diagram showing an example of data transmitted and received by the control system in accordance with a preferred embodiment of the present invention.
Figure 2B:
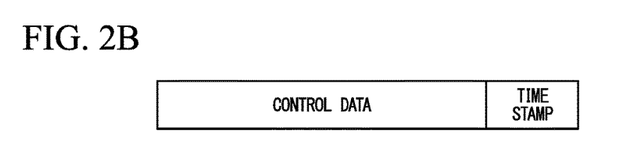
FIG. 2B is a diagram showing an example of data transmitted and received by the control system in accordance with a preferred embodiment of the present invention.

FIGS. 2A and 2B are diagrams showing an example of data transmitted and received by the control system in accordance with a preferred embodiment of the present invention, FIG. 2A showing data transmitted from the sensor device 11 to the control device 40 (first data), and FIG. 2B showing data transmitted from the control device 40 to the valve device 12 (second data). As shown in FIG. 2A, the data transmitted from the sensor device 11 to the control device 40 includes the measurement data obtained by the analog input unit 11a of the sensor device 11, with a time stamp (data indicating the time at which the measurement data was generated or the time at which it was transmitted: first time information) appended thereto.

As shown in FIG. 2B, the data transmitted from the control device 40 to the valve device 12 includes the control data to be transmitted to the valve device 12, with a time stamp (data indicating the time at which the control data was transmitted: second time information) appended thereto. The timing regulator 12b of the valve device 12 can therefore obtain the time t11 at which the control data was transmitted, by referring to the time stamp appended to the control data transmitted from the control device 40.

The wireless access point device 20 connects the wireless communication network N1, which the field devices 10 are connected to, and the backbone network N2, which the system manager 30 and the control device 40 are connected to, and relays various types of data that the field devices 10 transmit and receive to and from the system manager 30 and the control device 40. The wireless access point device 20 also performs wireless communication compliant with a wireless communication standard for industrial automation, such as ISA100.11a and WirelessHART (Registered Trademark).

The system manager 30 includes a management unit 31 and a communication unit 32, and executes management and control of wireless communication performed via the wireless communication network N1. The management unit 31 manages and controls resources such as the frequency channel, communication schedule, and communication path of the wireless communication network N1. The communication unit 32 performs communication with the wireless access point device 20 and the like via the backbone network N2. The system manager 30 sets the maximum delay time tolerated by the wireless communication network N1 at the control device 40 and at the field devices 10 belonging to the wireless communication network N1.

The control device 40 includes a communication unit 41, a timing regulator 42 (adjustment unit), a setting-value generator 43, and a Smith compensator 44 (delay compensation unit), and controls the flow of the fluid which is the controlled object via the backbone network N2 and the wireless communication network N1. Specifically, the control device 40 uses the measurement data transmitted from the field device 10 (sensor device 11) via the wireless communication network N1 and the backbone network N2 to create control data for controlling the fluid which is the controlled object, and transmits this control data via the backbone network N2 and the wireless communication network N1 to the field device 10 (valve device 12), thereby controlling the flow of the fluid which is the controlled object.

The communication unit 41 performs communication with the wireless access point device 20 and the like via the backbone network N2. The timing regulator 42 considers the maximum delay time tolerated by the wireless communication network N1, and adjusts the time from the reception of the measurement data transmitted from the field device 10 (sensor device 11) until the start of generating the control data (the time taken until the setting-value generator 43 starts to generate a setting-value). As with the valve device 12, the timing is adjusted in this manner to ensure stable execution of the control loop for controlling the flow of the fluid, even if there is a delay or a jitter in the wireless communication network N1.

Specifically, the timing is adjusted so that the setting-value generator 43 starts generating a setting-value at the point when the maximum delay time has elapsed from the point when the measurement data is generated at or transmitted from the sensor device 11. That is, if t21 is the time at which the measurement data is generated at or transmitted from the sensor device 11, and t22 is the time at which the measurement data is received at the communication unit 41 of the control device 40, the timing regulator 42 adjusts the timing so that the setting-value is generated when a period of time Ty shown in Equation (2) below has elapsed since time t22 when the measurement data was received at the communication unit 41. In Equation (2), Td is the maximum delay time tolerated by the wireless communication network N1.

$$Ty=Td-(t22-t21) \quad (2)$$

The setting-value generator 43 uses the measurement data from the sensor device 11 to generate a setting-value for controlling (PID (proportional integral derivative) controlling) the fluid which is the controlled object, at the timing adjusted by the timing regulator 42. The Smith compensator 44 compensates the delay of the measurement data and the control data that can occur in the wireless communication network N1. The Smith compensator 44 is set using a model of the fluid which is the controlled object and the maximum delay time tolerated by the network, and compensates the delay of the measurement data and the control data that can occur in the wireless communication network N1 by executing internal model control (IMC).

Figure 3:
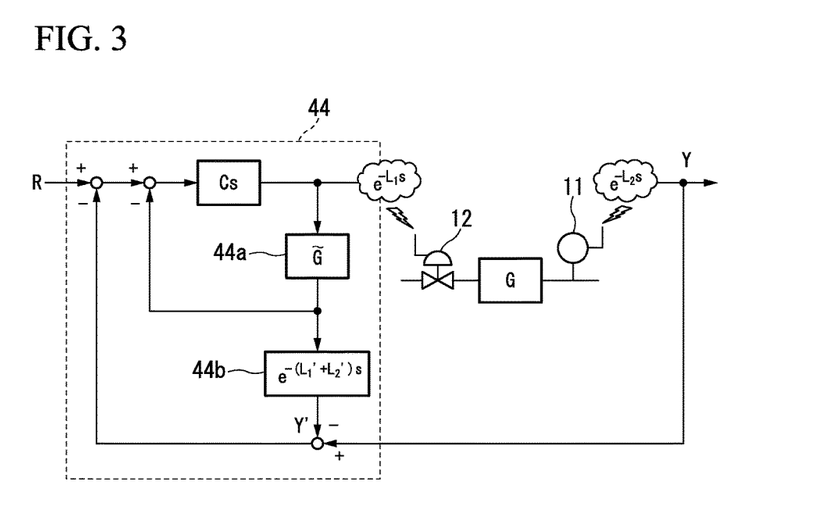
FIG. 3 is a block diagram of the configuration of the main part of a Smith compensator provided in a control device in accordance with a preferred embodiment of the present invention.

FIG. 3 is a block diagram of the configuration of the main part of a Smith compensator provided in a control device in accordance with a preferred embodiment of the present invention. In FIG. 3, 'G' represents the dynamic flow characteristic of the fluid which is the controlled object, '$L_1$' represents the delay time of the control data transmitted from the control device 40 to the valve device 12 in the wireless communication network N1, and '$L_2$' represents the delay time of the measurement data transmitted from the sensor device 11 to the control device 40 in the wireless communication network N1. The time delays '$L_1$' and '$L_2$' are not fixed, and change from moment to moment according to the state of the wireless communication being performed via the wireless communication network N1.

In FIG. 3, '$L_1$'' represents the maximum delay time (second maximum delay time) tolerated for the control data (the control data transmitted from the control device 40 to the valve device 12), and '$L_2$'' represents the maximum delay time (first maximum delay time) tolerated for the measurement data (the measurement data transmitted from the sensor device 11 to the control device 40). The maximum delay times '$L_1$'' and '$L_2$'' are set by the system manager 30. In FIG. 3, 'R' represents the setting-value generated by the setting-value generator 43, and 'Y' represents the present measurement data measured by the sensor device 11.

As shown in FIG. 3, the Smith compensator 44 is designed using a model element 44a that is a model of the fluid motion characteristic 'G' of the fluid which is the controlled object, and a delay element 44b where the maximum delay times 'L$_1$'' and 'L$_2$'' tolerated by the wireless communication network N1 are set, in addition to a controller 'Cs'. The Smith compensator 44 compensates error between the fluid motion characteristic 'G' of the fluid which is the controlled object and the model element 44a that is a model thereof, by feeding back the difference 'Y−Y''' between present measurement data 'Y' measured by the sensor device 11 and data 'Y''' output from the delay element 44b of the Smith compensator 44.

Figure 4:
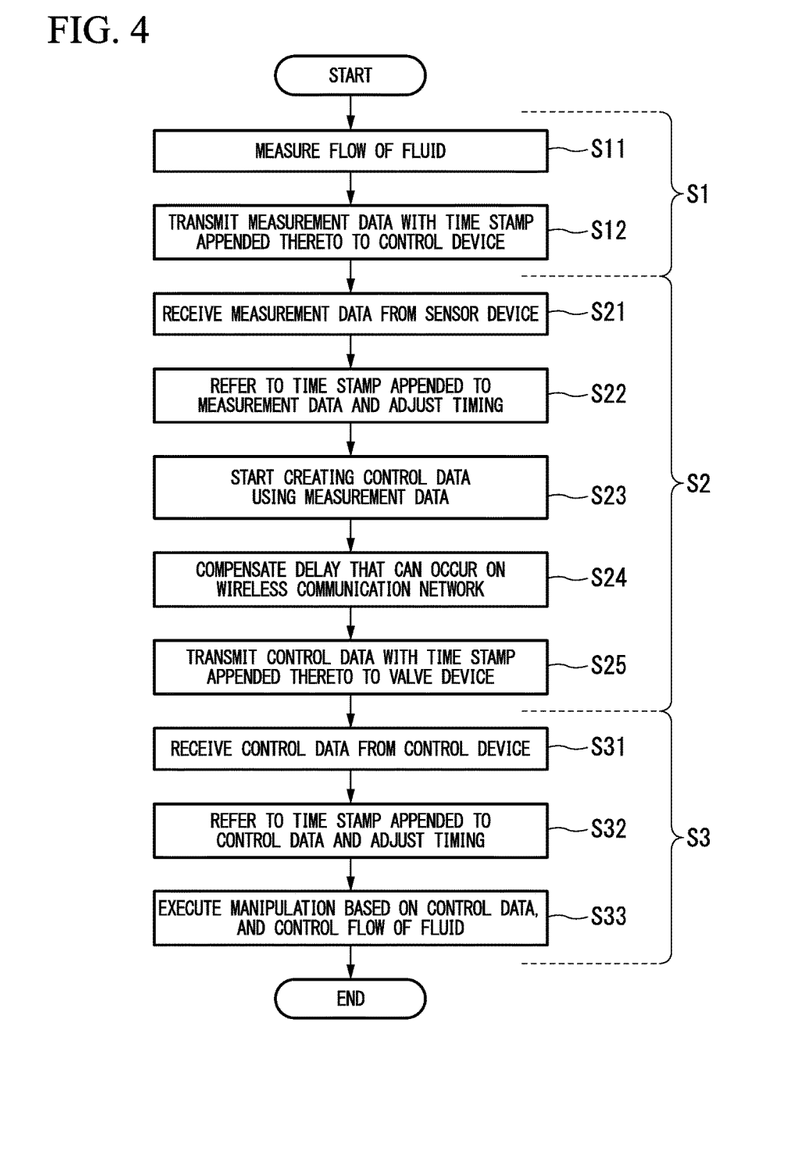
FIG. 4 is a flowchart of an operation of a control system in accordance with a preferred embodiment of the present invention.

Subsequently, an operation of the control system in the configuration described above will be explained. FIG. 4 is a flowchart of an operation of a control system in accordance with a preferred embodiment of the present invention. In FIG. 4, step S1 is a process performed by the sensor device 11, step S2 is a process performed by the control device 40, and step S3 is a process performed by the valve device 12. The process of the flowchart shown in FIG. 4 is repeated at a predetermined fixed time-interval (time-interval of control loop).

When the process of the flowchart in FIG. 4 starts, the sensor device 11 measures the flow of the fluid which is the controlled object (step S11). For example, an ultrasonic signal is transmitted to the fluid which is the controlled object from the analog input unit 11a and is received at the analog input unit 11a through the fluid, and the flow of the fluid is determined by performing a predetermined computation process to the receive signal obtained by the analog input unit 11a. When the flow of the fluid is measured, the measurement data with a time stamp (data indicating the time at which the measurement data was generated or the time at which it is transmitted) appended thereto is transmitted to the control device 40 (step S12).

The measurement data from the sensor device 11 is transmitted to the control device 40 via the wireless communication network N1, the wireless access point device 20, and the backbone network N2 in that order, and is received at the communication unit 41 of the control device 40 (step S21). The measurement data received at the communication unit 41 is input to the timing regulator 42, which refers to the time stamp appended to the measurement data. In accordance with the time stamp, the timing regulator 42 adjusts the time until control data starts to be generated using the measurement data (step S22).

Specifically, the timing regulator 42 adjusts the timing so that the setting-value generator 43 generates a setting-value when the period of time Ty shown in Equation (2) has elapsed since the time t22 at which the measurement data was received by the communication unit 41. When this adjustment ends, the timing regulator 42 outputs the measurement data from the sensor device 11 to the setting-value generator 43, and the setting-value generator 43 starts to create control data (setting-value) using the measurement data (step S23).

When the setting-value is generated, the Smith compensator 44 performs a process of compensating the delay of the measurement data and the control data that can occur in the wireless communication network N1 (step S24). When this process ends, the control device 40 transmits the control data, with a time stamp (data indicating the time at which the control data is transmitted) appended thereto, to the valve device 12 (step S25).

The control data from the control device 40 is transmitted to the valve device 12 via the backbone network N2, the wireless access point device 20, and the wireless communication network N1 in that order, and is received at the communication unit 12a of the valve device 12 (step S31). The control data received at the communication unit 12a is input to the timing regulator 12b, which refers to the time stamp appended to the control data. In accordance with the time stamp, the timing regulator 12b adjusts the timing of the manipulation (adjustment of valve aperture) to be performed based on the control data (step S32).

Specifically, the timing regulator 12b adjusts the timing so that the manipulation (adjustment of valve aperture) is performed when the period of time Tx shown in Equation (1) has elapsed since the time t12 at which the control data was received by the communication unit 12a. When this adjustment ends, the analog output unit 12c performs the manipulation based on the control data from the control device 40 (adjustment of the aperture of the valve for controlling the flow of the fluid) at the timing adjusted by the timing regulator 12b (step S33). The operation described above is repeated, controlling the flow of the fluid which is the controlled object.

As described above in this preferred embodiment, the control device 40 considers the maximum delay time tolerated by the wireless communication network N1 and adjusts the time from the reception of the measurement data from the sensor device 11 until the start of generating control data using this measurement data; in addition, it adjusts the delay of the measurement data and the control data that can occur in the wireless communication network N1. The valve device 12 considers the maximum delay time and adjusts the timing from receiving the control data from the control device 40 until performing a manipulation (adjustment of the aperture of the valve for controlling the flow of the fluid). Therefore, even when the controlled object is being controlled via an unstable network such as the wireless communication network N1, it is possible to execute the control loop stably, and to increase the safety and reliability of the plant etc.

While a control device and a control system in accordance with a preferred embodiment of the present invention have been described above, the invention is not limited to this preferred embodiment, and can be modified freely within the scope of the invention. For example, while this preferred embodiment describes an arrangement where the wireless access point device 20, the system manager 30, and the control device 40 are each provided separately, the invention can be arranged with the wireless access point device 20 and the control device 40 as a single unit, and the system manager 30 can also be arranged as a single unit with them. In such an arrangement, the backbone network N2 can be omitted.

While the foregoing preferred embodiment describes an example where the maximum delay time tolerated by the wireless communication network N1 is fixed, the maximum delay time can be changed dynamically. For example, the system manager 30 can store a table that correlates numbers of field devices 10 belonging to the wireless communication network N1 with the maximum delay times corresponding to those numbers of field devices 10. Every time the number of field devices 10 belonging to the wireless communication network N1 increases, the maximum delay time can be changed dynamically after referring to the table.

The foregoing preferred embodiment describes an example where the setting-value generator 43 generates a setting-value for PID-controlling the flow of a fluid which is the controlled object. In this invention, however, the method of controlling the controlled object is not limited to PID control, and another control method (e.g. model predictive control) can be used. The setting-value generator 43 can therefore be replaced with a setting-value generator that generates a setting-value for executing model predictive control of the flow of the fluid which is the controlled object.

Furthermore, the foregoing preferred embodiment describes an example where the system manager 30 manages and controls the fluid which is the controlled object via the wireless communication network N1. However, the invention is also capable of controlling a controlled object via an unstable network that is susceptible to delays or jitters, such as a public wireless local area network (LAN) or the internet.

Therefore, the invention can be applied not only in an application for controlling various state quantities (e.g. pressure, temperature, flow volume, etc.) in an industrial process realized at a plant (plant control), but also in the following applications (1) to (3).

(1) Cloud-computing based production management and high-level control
(2) Teleoperation of robots
(3) Building automation Application (1)

Presently, cloud-computing environments are becoming fuller and larger, and optimization solutions provided by production management and high-level control above the manufacturing execution system (MES) layer are increasingly being supplied via a wide area network. Under these circumstances, there are advancements not just in field wireless but also in networking on the backbone side, and there is a growing need to control production systems via a network infrastructure. If the present invention is applied for such purposes, in the future it will be possible to perform many types of control via networks.

Application (2)

The present invention can be applied in the remote operation of space robots and plant robots, etc. For example, in plant operations, a remote control robot with a camera and a manipulator mounted on it can conceivably be used to perform remote maintenance work. The invention makes it possible to stably control such a robot automatically and manually. In particular, since many robots operate in a control cycle of some milliseconds and are heavily affected by communication delays and jitters, their performance can be greatly enhanced by applying the invention.

Application (3)

The invention can conceivably be applied in automations for controlling lighting, switches, and air-conditioning. In building management, it is important to reduce running costs by managing energy, and the invention can be applied as a means of performing such energy management.

INDUSTRIAL APPLICABILITY

The present invention can be widely applied to a controller and a control system. Even if the controlled object is being controlled via an unstable network, the invention obtains an advantage of being able to stably execute the control loop.

DESCRIPTION OF THE REFERENCE SYMBOLS 1 control system
10 field device
11 sensor device
11a analog input unit
11b communication unit
12 valve device
12a communication unit
12b timing regulator
12c analog output unit
20 wireless access point device
30 system manager
31 management unit
32 communication unit
40 control device
41 communication unit
42 timing regulator
43 setting-value generator
44 Smith compensator
44a model element
44b delay element
N1 wireless communication network
N2 backbone network
Td maximum delay time

The invention claimed is:

1. A controller, said controller being connectable to at least a first field device and a second field device which controls a control target via a network, the controller comprising:
circuitry configured to at least:
receive first data transmitted from the first field device via the network, the first data containing first time information indicating a time at which the first data was generated or transmitted;
adjust a timing so that second data for controlling the control target is started to be generated at a timing when a period of time, which is obtained by subtracting a difference between the time indicated by the first time information and a time at which the first data was received from a maximum delay time tolerated by the network, has elapsed from a point at which the first data was received;
generate the second data using the first data at the adjusted timing;
compensate for delays in transmission time of the first and second data that can occur in the network; and
transmit the second data to the second field device,
wherein the circuitry is configured to further:
compensate for the delays by feeding back a difference between present measurement data and data output from a delay element where the maximum delay times tolerated by the network are set.

2. A control system comprising a controller, said controller being connectable to at least a first field device and a second field device which controls a control target via a network, the controller comprising:
circuitry configured to at least:
receive first data transmitted from the first field device via the network, the first data containing first time information indicating a time at which the first data was generated or transmitted;
adjust a timing so that second data for controlling the control target is started to be generated at a timing when a period of time, which is obtained by subtracting a difference between the time indicated by the first time information and a time at which the first data was received from a maximum delay time tolerated by the network, has elapsed from a point at which the first data was received;
generate the second data using the first data at the adjusted timing;
compensate for delays in transmission time of the first and second data that can occur in the network; and
transmit the second data to the second field device, the second field device comprising:
circuitry configured to at least:
consider the maximum delay time tolerated by the network; and
adjust a timing of a manipulation of the control target based on the second data transmitted from the controller,
wherein the circuitry in the controller is configured to further:
compensate for the delays by feeding back a difference between present measurement data and data output from a delay element where the maximum delay times tolerated by the network are set.

3. The control system according to claim 2, wherein the maximum delay time tolerated by the network includes:
a first maximum delay time tolerated for data transmitted to the controller; and
a second maximum delay time tolerated for data transmitted from the controller.

4. The control system according to claim 2, further comprising circuitry configured to further:
set the maximum delay time tolerated by the network with respect to the controller and the field devices.

5. The control system according to claim 2, wherein the circuitry in the controller is configured to further:
generate a setting-value for controlling the control target, at the timing adjusted by the controller, by using the first data from the first field device.

6. A control method comprising:
receiving first data transmitted from a first field device via a network, the first data containing first time information indicating a time at which the first data was generated or transmitted;
adjusting a timing so that second data for controlling a control target is started to be generated at a timing when a period of time, which is obtained by subtracting a difference between the time indicated by the first time information and a time at which the first data was received from a maximum delay time tolerated by the network, has elapsed from a point at which the first data was received;
generating the second data using the first data at the adjusted timing;
compensating for delays in transmission time of the first and second data that can occur in the network; and
transmitting the second data to a second field device which controls the control target via the network,
wherein the control method further comprises:
compensating for the delays by feeding back a difference between present measurement data and data output from a delay element where the maximum delay times tolerated by the network are set.

7. The control method according to claim 6, further comprising:
adjusting a timing of a manipulation of the control target based on the second data transmitted.

8. The control method according to claim 6, wherein the maximum delay time tolerated by the network includes:
a first maximum delay time tolerated for data transmitted to a control device; and
a second maximum delay time tolerated for data transmitted from the control device.

9. The control method according to claim 6, further comprising:
setting the maximum delay time tolerated by the network with respect to a controller and the field devices.

10. The control method according to claim 6, further comprising:
generating a setting-value for controlling the control target, at the timing adjusted, by using the first data from the first field device.

* * * * *